(12) United States Patent
Disisto

(10) Patent No.: US 10,921,799 B2
(45) Date of Patent: Feb. 16, 2021

(54) MOTOR DRIVEN EQUIPMENT MAINTENANCE MONITORING SYSTEM

(71) Applicant: Equipbit, Inc., Virginia Beach, VA (US)

(72) Inventor: Thomas Disisto, Virginia Beach, VA (US)

(73) Assignee: Equipbit, Inc., Virginia Beach, VA (US)

( * ) Notice: Subject to any disclaimer, the term of this patent is extended or adjusted under 35 U.S.C. 154(b) by 471 days.

(21) Appl. No.: 15/976,324

(22) Filed: May 10, 2018

(65) Prior Publication Data

US 2018/0329407 A1 Nov. 15, 2018

Related U.S. Application Data

(60) Provisional application No. 62/504,259, filed on May 10, 2017.

(51) Int. Cl.
  *G05B 23/02* (2006.01)
  *G07C 3/02* (2006.01)
  *G07C 3/00* (2006.01)

(52) U.S. Cl.
  CPC .......... *G05B 23/0283* (2013.01); *G07C 3/00* (2013.01); *G07C 3/02* (2013.01)

(58) Field of Classification Search
  None
  See application file for complete search history.

(56) References Cited

U.S. PATENT DOCUMENTS

| 2005/0242003 A1* | 11/2005 | Scott | B01D 33/0315 209/363 |
| 2006/0243643 A1* | 11/2006 | Scott | B07B 1/4663 209/309 |
| 2010/0235002 A1* | 9/2010 | Dufilho | B01D 33/37 700/275 |

FOREIGN PATENT DOCUMENTS

| CN | 101025626 | * | 8/2007 | Y02P 90/02 |
| CN | 100442063 | * | 12/2008 | G01R 31/00 |
| CN | 103914962 | * | 7/2014 | G08C 17/02 |
| CN | 104165138 | * | 11/2014 | F04B 51/00 |
| CN | 203950175 | * | 11/2014 | Y02P 90/02 |
| CN | 204025016 | * | 12/2014 | F04B 51/00 |
| CN | 102706569 | * | 4/2015 | G01M 17/08 |
| CN | 104699068 | * | 6/2015 | G05B 23/02 |
| CN | 105391182 | * | 3/2016 | H02J 13/00 |
| CN | 105759731 | * | 7/2016 | Y02P 90/02 |

(Continued)

*Primary Examiner* — Tung S Lau
(74) *Attorney, Agent, or Firm* — Diederiks & Whitelaw, PLC.

(57) ABSTRACT

A system and method designed to track usage across multiple pieces of motor-driven equipment and to analysis the usage data in order to identify which pieces of equipment should be sent for preventative maintenance. For each piece of equipment, the system includes a durable recording device that fits onto a body part of a piece of equipment, such as a portable landscaping tool, and a companion reporting component. The recording device senses parameters as in-use time, but also operational frequency vibration levels of use. The reporting components from various pieces of equipment can be linked to an authorized electronic device, such as a Bluetooth-enabled mobile cell phone, tablet or the like, for the transfer of data from each piece of equipment, with the electronic device analyzing the operational data for preventive maintenance purposes.

20 Claims, 4 Drawing Sheets

(56) References Cited

FOREIGN PATENT DOCUMENTS

| | | | | | |
|---|---|---|---|---|---|
| CN | 106774050 | * | 5/2017 | ............ | G05B 19/048 |
| CN | 206805281 | * | 12/2017 | ............ | G05B 19/418 |
| CN | 107764336 | * | 3/2018 | ............. | G01D 21/02 |
| CN | 207115476 | * | 3/2018 | ............. | G06Q 10/06 |
| CN | 104268678 | * | 5/2018 | ............. | G06Q 10/06 |
| CN | 207457364 | * | 6/2018 | ............. | G01R 31/00 |
| WO | WO 2006061917 | * | 6/2006 | ......... | G07C 9/00309 |

* cited by examiner

MOTOR DRIVEN EQUIPMENT MAINTENANCE MONITORING SYSTEM

CROSS REFERENCE TO RELATED APPLICATIONS

This application claims the benefit of U.S. Provisional Application No. 62/504,259, which was filed on May 10, 2017 and titled "Motor Driven Equipment Maintenance Monitoring System". The entire content of this application is incorporated herein by reference.

BACKGROUND OF THE INVENTION

The present invention pertains to the field of maintenance monitoring and, more specifically, to a system and method for monitoring the usage of motor driven equipment, particularly landscape equipment, for maintenance purposes.

In the landscaping field, it is not uncommon for power equipment to fail to get scheduled for proper preventive maintenance. In many case, the only time power equipment is worked upon is after the equipment breaks down. Overall, preventative maintenance of landscaping equipment is a difficult to schedule activity for many companies. Typically, the scheduling of landscape equipment maintenance has simply relied on calendar reminders. For instance, a landscaping company may change the oil in four-stroke machines periodically, such as every few months. However, a calendar based system does not account for actual equipment use time.

In addressing this drawback, it is also known to count the hours or distance of equipment usage in connection with certain landscaping machines, such as riding lawnmowers, using an analog type of device, such as a clock or odometer. Although this type of maintenance monitoring is preferable to no system at all or even a calendar based system, these devices must be checked visually for each piece of equipment fitted with such a device. In addition, a clock or odometer will only provide information on the running of the machine, not actually the degree to which the machine was used. For example, a time based system will provide the same indication for a machine which is run at idle 50% of the time and a machine which is run at top speed 90% of the time. Odometer based systems exhibit a corresponding drawback.

Based on the above, there exists a need in the art for a system and method for monitoring the usage of motor-driven equipment for maintenance purposes which is based on data collected on actual operational parameters of the equipment, thereby enabling the maintenance scheduling to more accurately correlate to the need for actual maintenance and assuring the prolonged useful life of the equipment. In addition, it would be beneficial to provide tracking devices which transmit data wirelessly, thereby avoiding the need for direct visual inspection of each piece of motorized equipment.

SUMMARY OF THE INVENTION

The present invention is directed to a system and method for monitoring the usage of motor-driven equipment for maintenance purposes. In accordance with the invention, the system is designed to track usage across multiple pieces of equipment and to analysis the usage data in order to identify which pieces of equipment should be sent for preventative maintenance. In order to provide accurate operational data, the system employs a durable recording device that fits onto a body part of the motor-driven equipment, such as the shaft of a landscaping trimmer for example, and a companion reporting component. In this manner, the system of the invention senses operational vibrations, generally analogous to technology currently employed to track various human activities, such as steps walked, stairs climbed, miles jogged, etc. In this way, the system can not only convey such parameters as in-use time, but importantly the frequency vibration levels (high rpms=high frequency vibration levels) of use. The system is linked to an authorized electronic device, such as a Bluetooth-enabled mobile cell phone, tablet or the like, for the transfer of data from each piece of equipment. The data can be based on various factors, such as level of individual use or aggregate use versus other equipment pieces of the same type.

With the above in mind, a preferred embodiment of the invention is directed to providing a device designed to be secured to a body portion of a piece of landscape equipment so as to monitor operational times and vibration frequencies of the equipment. By way of example, the device may be wrapped about and secured to the shaft of a string or edge trimmer, with the device being automatically activated upon sensing a predetermined level of vibration from the machine. Upon activation, the device collects operational data, such as usage times and continual machine operational levels. The data can be concurrently or later transmitted to another electronic unit, preferably wirelessly but also potentially through a wired connection. This electronic unit can process the data through suitable software which compares usage data with predefined thresholds to signal the need for preventative maintenance. Additional data presentations, such as establishing spreadsheets or the like for review, could also be available and even customizable.

In accordance with the most preferred embodiments of the invention, the device is made of durable materials, such as rubber and plastic, so as to be able to withstand inclement weather and the wear and tear of outdoor landscaping activities. The device can be secured in a number of fashions, including with the use of a wide range of mechanical fastening systems, such as clasps, clips, clamps, VELCRO and the like, or any other known securing arrangements. Each device bears a unique "digital identifier" such that transmitted data from each device is uniquely identifies the particular equipment to which it is secured.

Additional objects, features and advantages of the invention will become more fully apparent from the following detailed description of the invention when taken in conjunction with the following drawings wherein like reference numerals refer to corresponding parts in the several views.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
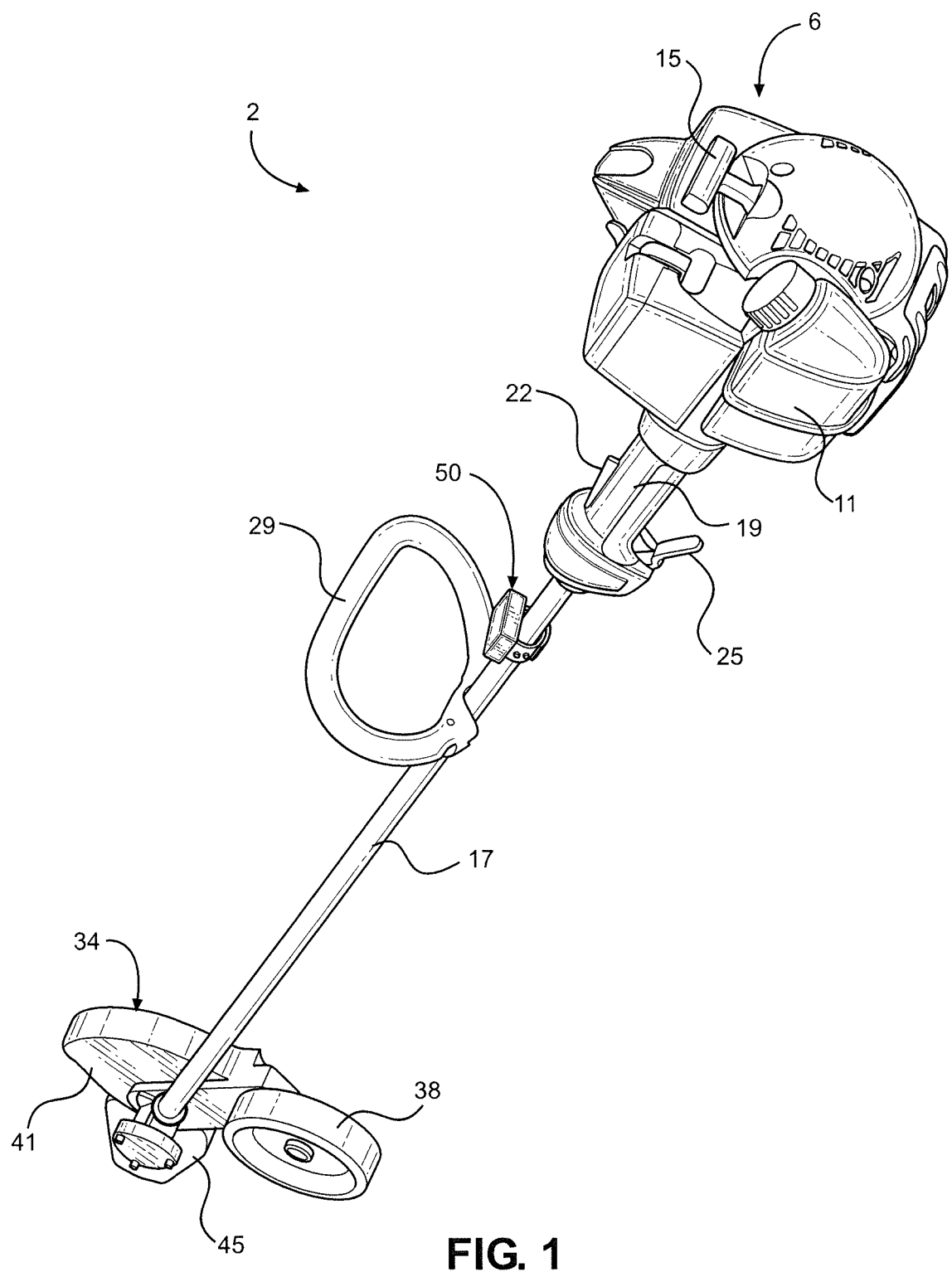
FIG. 1 is a perspective view of a edge-type trimmer having mounted thereto a monitoring device in accordance with the present invention.

With initial reference to FIG. 1, the invention will now be described in connection with its use in obtaining operational data for a portable landscaping power tool constituted by a edge-type landscaping trimmer generally indicated at 2. As is known in the art, trimmer 2 generally includes an engine 6 which is supplied with fuel stored in a tank 11 and can be started through a pull cord 15. As output (not shown) of engine 6 extends within an elongated shaft 17 of trimmer 2. Provided along shaft 17, generally directly adjacent engine 6, is a handle grip 19 having an upper safety switch 22 and an associated, manually operated trigger throttle 25 for controlling the operation of engine 6. Further down along an intermediate portion of shaft 17 is mounted a hooped handle 29. At the end of shaft 17 remote from engine 6 is provided an edger unit 34 including a support wheel 38, a cowling 41 and an engine driven blade 45.

As further details on the structure and operation of trimmer 2 are known in the art and not part of the present invention, they will not be discussed further here. Instead, the invention is directed to providing a portable landscaping power tool, such as trimmer 2, with a usage sensor or monitor 50. In the embodiment shown in this figure, usage monitor 50 is removably strapped onto shaft 17, specifically between grip 19 and handle 29. However, as will become more readily apparent below, usage monitor 50 can be fixedly or readily removably mounted in various locations to the portable landscaping power tool. Instead, at this point, it is only important to note that usage monitor 50 is sensitive to vibrations developed during operation of the portable landscaping power tool and is used in connection with the overall invention to gather and/or provide information on the operational times and vibration frequencies to which the equipment is subjected, with this information being used to determine the appropriate intervals between preventive maintenance periods of the tool.

Figure 2:
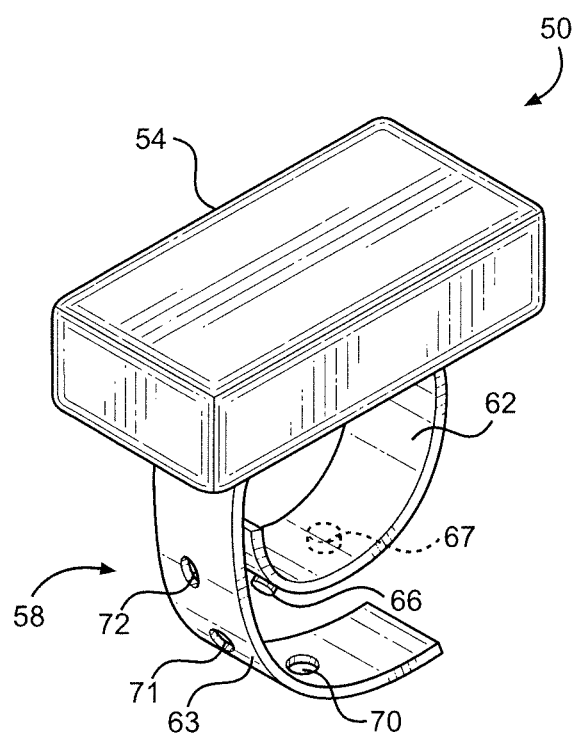
FIG. 2 is a perspective view of the monitoring device with an open attachment strap.
Figure 3:
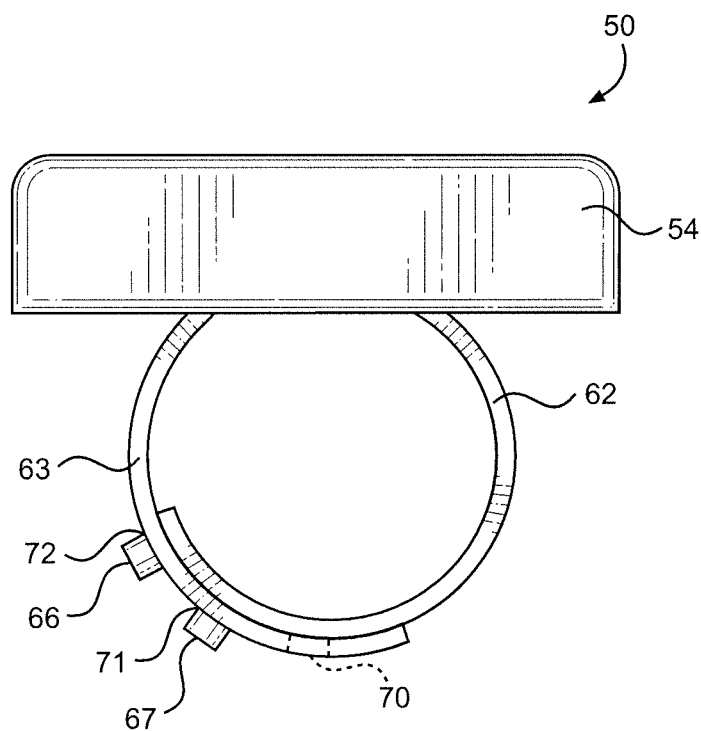
FIG. 3 is a side elevational view of the monitoring device with the strap show closed.

Although usage monitor 50 can take various forms without departing from the invention, FIGS. 2 and 3 will now be referenced in describing one potential embodiment thereof. As shown, usage monitor 50 generally includes a housing 54 and a connector 58. In the embodiment shown, connector 58 includes a first or inner strap 62 and a second or outer strap 63, with inner strap 62 being provided with multiple, outwardly projecting pegs 66 and 67 and outer strap 63 being formed with a plurality of spaced holes 70-72. Each of pegs 66, 67 can be tightly fit into a selective on of holes 70-72 to interconnect inner and outer straps 62 and 63 and secure housing 54 against a portion of the portable landscaping power tool (here strapping usage monitor 50 to shaft 17 of trimmer 2), with the various peg 66, 67 and hole 70-72 combinations providing for adjusting the tightness of the connection, much in the same way a watch band provides adjustment about a wearer's wrist. Again, the specific manner of attachment can greatly vary in accordance with the invention such that a wide range of known attachment mechanisms, including a wide range of clasps, clips, clamps, VELCRO and the like, could be employed.

Figure 4:
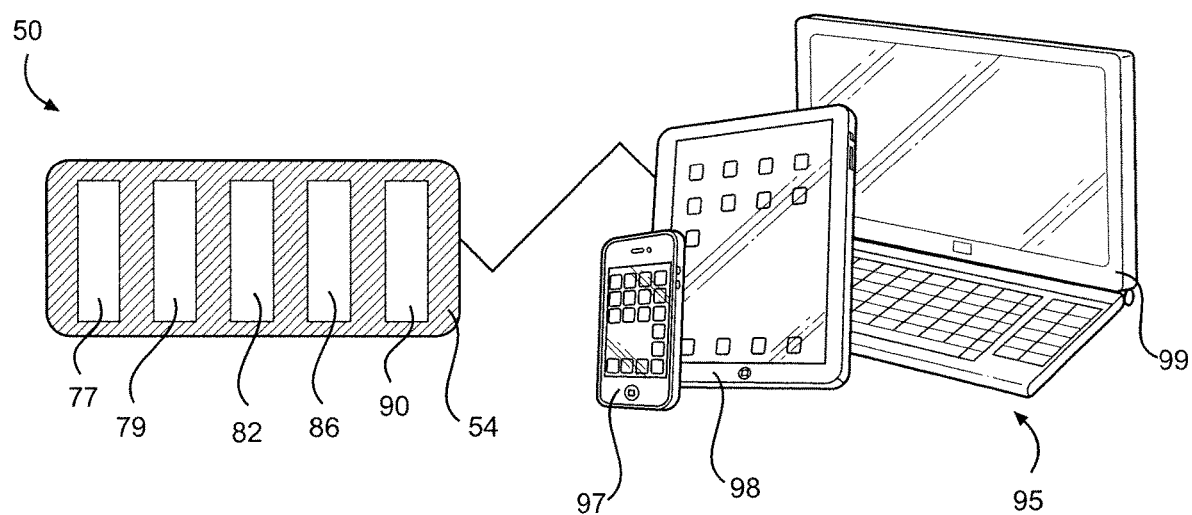
FIG. 4 illustrates the monitoring device in combination with peripheral data collection and compiling devices.

More important in connection with the invention is the construction of usage monitor 50 and the manner in which information collected by usage monitor 50 is communicated and utilized in assuring the proper scheduling of preventative maintenance for the landscaping power tool. With this in mind, reference will now be made to FIG. 4 which generically illustrates internal components of usage monitor 50, as well as communication aspects thereof. As depicted, housing 54 of usage monitor 50 incorporates a power supply in the form of a battery 77, a vibration sensor 79, a memory 82, a CPU 86 and a data communicator 90. Data communicator 90 can be hardwired, such as through a removable cord, or wirelessly connected, such as through RF or BLUETOOTH connections, to one or more host devices generally indicated at 95. Overall, the host device 95 can take various forms, such as a smart phone 97, a tablet 98 or a laptop computer 99. Preferably, each usage monitor 50 bears a unique "digital identifier" such that transmitted data from each usage monitor 50 uniquely identifies the particular equipment to which it is secured.

Figure 5:
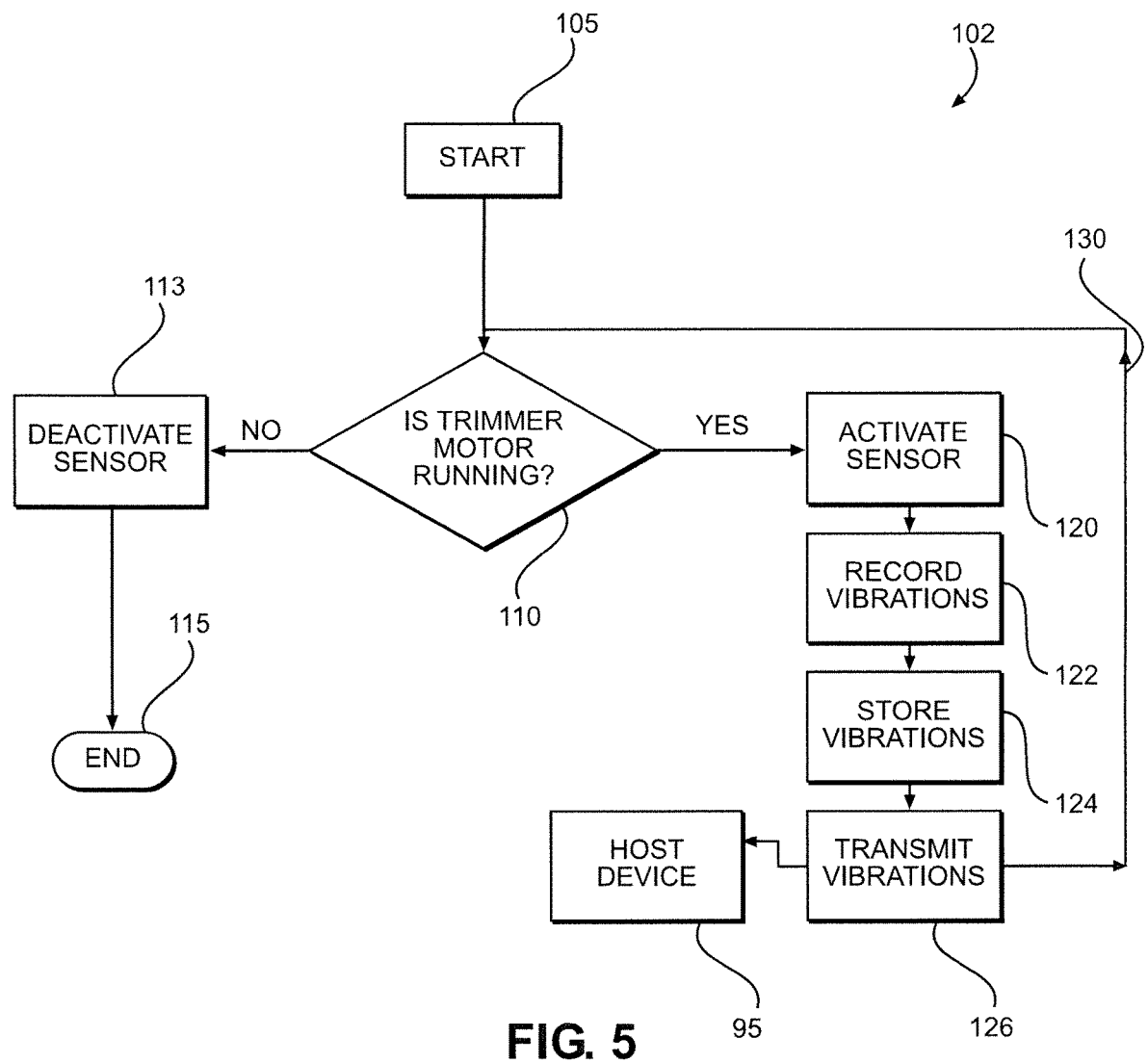
FIG. 5 is a flow chart illustrating a basic operational method in accordance with the invention.

For a description of the operation of usage monitor 50, reference will now be made to FIG. 5 which illustrates an operational algorithm 102 for use in connection with the invention. As shown, algorithm 102 is initiated at start step 105 and then proceeds to determine if engine 6 of trimmer 2 is running at 110. If engine 6 is not running, then usage monitor is automatically deactivated at 113 and the algorithm ends at 115. However, if it is determined at step 110 that trimmer 2 is operating, usage monitor 6 is fully activated at 120 and proceeds to record and measure operational parameters, such as vibrations at 122, with these vibration signals being stored at 124. At predetermined operational time periods, which can range from concurrent with the sensing operation to a calendar basis, the signals stored in step 124 are transmitted to host device 95 for further evaluation. When no signals are transmitted for a predetermined period of time, a signal is sent along a return line 130 to again check if engine 6 is running at 110.

The manner in which the vibrational information is relied upon can vary. For instance, vibrational frequencies in different ranges can be accumulated to determine how long the power tool has been operated a different operational ranges, e.g., idle, mid-speed and high-speed. Depending on the particular maintenance scheduling regime of the company or individual, a maintenance message or alarm can be automatically sent to a specified person responsible to assuring the functioning and life span of the power tool. By way of example, after a predetermine number of hours of operation above a specified vibrational frequency, the power tool can be taken for preventative lubrication, adjustment and/or safety check purposes.

Based on the above, it should be readily apparent that the present invention provides a device designed to be secured to a body portion of a piece of landscape equipment so as to monitor operational times and/or vibration frequencies of the equipment. Upon activation, the device collects operational data, such as usage times and continual machine operational levels. In a simple form, use-time is automatically recorded whenever the machine is operating above a predetermined, sensed vibration level, such as above an idle condition. More elaborate versions actually collect vibration data in different operational ranges as discussed above. In any case, the data can be concurrently or later transmitted to another electronic unit, preferably wirelessly but also potentially through a wired connection. This electronic unit can process the data through suitable software which compares usage data with predefined thresholds to signal the need for preventative maintenance. Additional data presentations, such as establishing spreadsheets or the like for review, could also be available and even customizable. Preferably, the CPU on the device is triggered to automatically commence tracking and transmitting data upon the starting of the implement's motor, thereby avoiding false tracking of vibrations by accidental or inadvertent jostling of the implement. Similarly, the CPU is triggered to automatically stop tracking vibrations by the powering off of the implement's motor. Thus, continuous cycles of tracking and transmitting operational information are triggered by the starting of the implement's motor, and cessation of tracking and transmitting of the data are triggered by the powering off of the implement's motor. In this sense, there is no mandatory action required by the user to start or stop tracking/transmitting, other than to power on or power off the implement. The adjustable mounting system allows the device to be fastened to numerous landscaping implements of varying designs, such as drive shaft-driven mowers and tractors, by simply expanding the adjustable fastener to fit snugly around the shaft. On the other hand, the housing of the device could be constructed to provide for a direct, fixed mounting, such as screw or bolt mounting, of the monitor to a given implement. The accompanying product is the control application, installable on any Bluetooth-enabled device such as a mobile phone, tablet or laptop. This application is designed to receive transmitted data from multiple authorized monitor-equipped implements, such as commonly found in landscaping companies, and, via an application "dashboard", to provide run-time usage analytics, such as per implement, per time period, and aggregated information. An associated control can displays each authorized unique digital identifier, along with the implement's manufacturer, model name, model number, date of manufacture, date placed into service, serial number and dynamically-downloaded information from the manufacturer's website (e.g. recommended preventative maintenance periods), with this information being collectively identified as "HEADER" information. The dashboard could also display "DETAIL" information that correlates to the above HEADER information, such as the current vibration count, average count per day, count since last preventative maintenance performed on that particular implement and the like. Varying color indicia, such as RED, YELLOW or GREEN visual indicators, could be employed to flag monitor-enabled implements that are in immediate need of preventative maintenance (RED), within 15% to scheduled preventative maintenance (YELLOW), or greater than 15% to scheduled preventative maintenance (GREEN). The dashboard can also display aggregated information, i.e. all device-enabled implements combined into a single view. In addition, provisions can be made to enable dashboard factory settings (e.g. manufacturer recommended preventative maintenance periods for each implement) to be overridden to user-customizable thresholds for usage alerts. Data within the application will be downloadable for any additional analysis, using spreadsheets, for example.

Although described with reference to preferred embodiments of the invention, it should be readily apparent that various changes and/or modifications can be made to the invention without departing from the spirit thereof. For instance, although the invention has been described in connection with a landscaping trimmer, the invention is applicable to a wide range of motor-driven equipment, including other landscaping, earthworking, marine and the like equipment, which would benefit from scheduled maintenance and safety checks.

The invention claimed is:
1. A system for monitoring usage of motor-driven equipment for maintenance purposes comprising:
  a portable piece of equipment including a motor and a body part connected to the motor wherein, during operation, the motor generates vibrations, wherein the piece of equipment is a piece of landscaping or marine equipment;
  a monitoring device mounted on the piece of equipment, said monitoring device including a recording component configured to sense the vibrations developed during operation of the motor and a reporting component configured for transmitting operational data collected on the piece of equipment during operation of the motor; and
  an electronic analyzer unit configured to be connected to the monitoring device for the transfer of the operational data from the monitoring device to the electronic analyzer unit, wherein the electronic analyzer unit is configured to process the operational data to determine a need for maintenance on the piece of equipment.

2. The system according to claim 1, wherein the piece of equipment is a piece of landscaping equipment.

3. The system according to claim 2, wherein the piece of landscaping equipment is a portable landscaping power tool.

4. The system according to claim 3, wherein the portable landscaping power tool is a trimmer.

5. The system according to claim 4, wherein the body part is a shaft of the trimmer and the monitoring device is secured to the body part of the trimmer.

6. The system according to claim 1, wherein the recording component is configured to store in-use time of the piece of equipment.

7. The system according to claim 6, wherein the recording component is configured to store frequency vibration levels generated during operation of the motor.

8. The system according to claim 1, wherein the electronic analyzer unit is wirelessly linked to the monitoring device.

9. The system according to claim 1, wherein the electronic analyzer unit is constituted by a mobile cell phone or computer tablet.

10. The system according to claim 1, wherein the monitoring device is configured to be automatically activated upon sensing a predetermined level of vibration from the motor.

11. The system according to claim 1, wherein the monitoring device is waterproof.

12. The system according to claim 1, further comprising: a plurality of pieces of equipment each having secured thereto a respective said monitoring device, wherein each said monitoring device is connected to the electronic analyzer unit and has a unique identifier such that transmitted operational data from each said monitoring device uniquely identifies its respective said piece of equipment.

13. A system for monitoring usage of motor-driven equipment for maintenance purposes comprising:
  a monitoring device configured to be mounted on a piece of equipment including a motor which generates vibrations during operation, said monitoring device including a recording component configured to sense the vibrations developed during operation of the motor and a reporting component configured for transmitting operational data collected on the piece of equipment during operation of the motor, wherein the piece of equipment is a piece of landscaping or marine equipment; and
  an electronic analyzer unit configured to be connected to the monitoring device for the transfer of the operational data from the monitoring device to the electronic analyzer unit, wherein the electronic analyzer unit is configured to process the operational data to determine a need for maintenance on the piece of equipment.

14. The system according to claim 13, wherein the piece of equipment is a portable landscaping power tool.

15. A method of monitoring usage of motor-driven equipment for maintenance purposes comprising:
automatically initiating monitoring of at least one operational parameter based on vibrations generated during use of a portable, motor-driven piece of equipment through use of a monitoring device mounted on the piece of equipment, wherein the piece of equipment is a piece of landscaping or marine equipment;
recording operational data collected on the piece of equipment during operation of the motor-driven piece of equipment as sensed by the monitoring device;
transferring the operational data to an electronic analyzer unit configured to process the operational data to determine a need for maintenance on the piece of equipment; and
identifying a need for maintenance on the piece of equipment based on the operational data.

16. The method of claim 15, wherein the portable, motor-driven piece of equipment is a piece of landscaping equipment.

17. The method of claim 16, further comprising:
monitoring a plurality of distinct, portable, motor-driven pieces of equipment with individual monitoring devices to generate operational data on each portable, motor-driven piece of equipment;
transferring the operational data on each portable, motor-driven piece of equipment to the electronic analyzer unit; and
comparing the operational data for the plurality of distinct, portable, motor-driven pieces of equipment to determine which of the plurality of distinct, portable, motor-driven pieces of equipment need preventive maintenance.

18. The method of claim 15, further comprising: automatically activating the monitoring device only upon sensing a predetermined level of vibration from the motor.

19. The method of claim 15, wherein the recording component stores both in-use time and frequency vibration levels generated during operation of the motor of the piece of equipment.

20. The method of claim 15, further comprising: wirelessly transferring the operational data to the electronic analyzer unit.

* * * * *